Sept. 5, 1939.  F. CARTLIDGE  2,171,647
TRANSMISSION DEVICE
Filed June 25, 1937
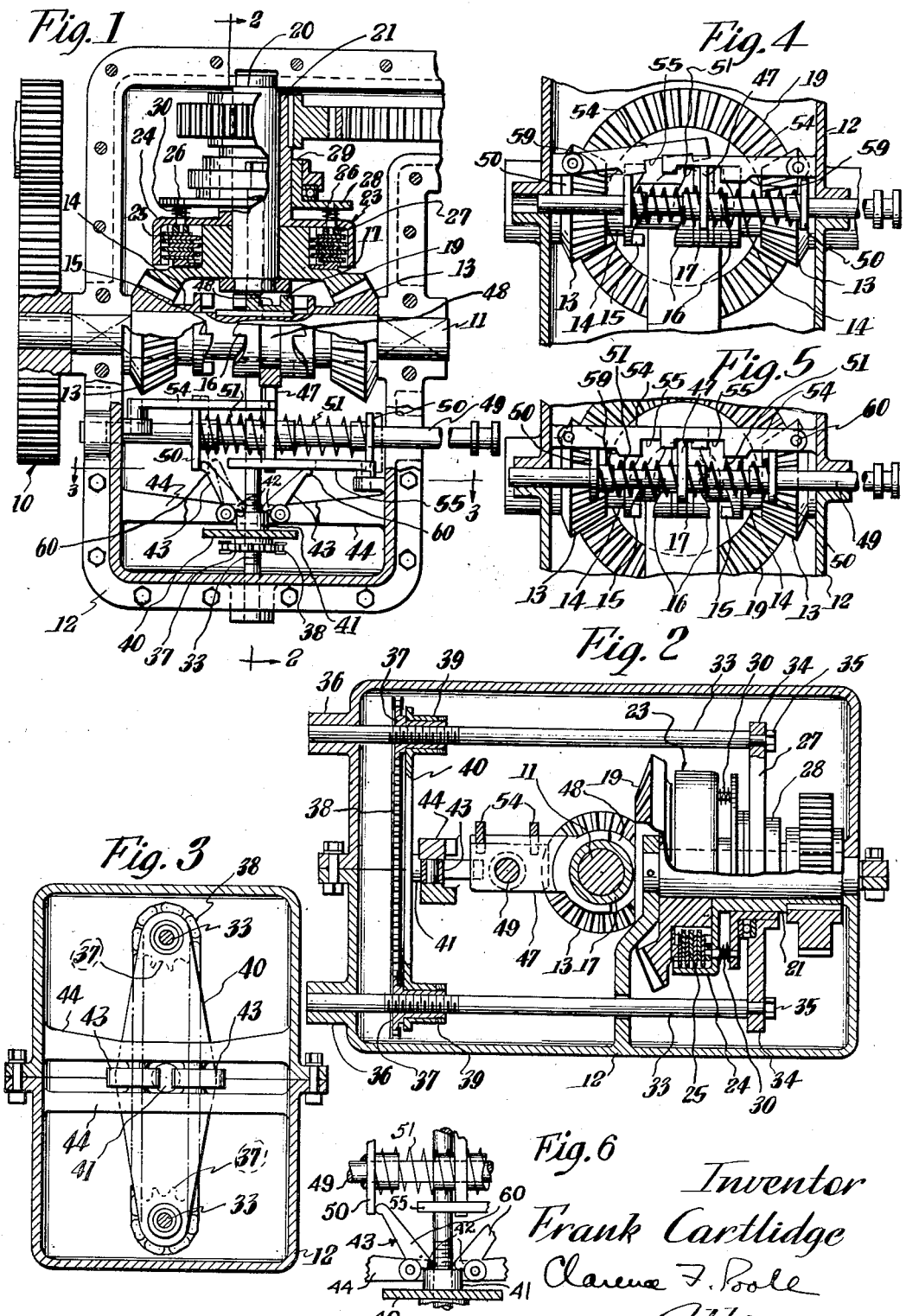
Inventor
Frank Cartlidge
Clarence F. Poole
Attorney Patented Sept. 5, 1939

2,171,647

UNITED STATES PATENT OFFICE 2,171,647

TRANSMISSION DEVICE

Frank Cartlidge, Chicago, Ill., assignor to Goodman Manufacturing Company, Chicago, Ill., a corporation of Illinois Application June 25, 1937, Serial No. 150,388

13 Claims. (Cl. 192—3.5)

This invention relates to improvements in transmission devices and more particularly relates to improvements in the clutch shifting mechanism of a reversible transmission device Among the objects of my invention are to provide a positive shifting means of a novel and simple construction for a reversible transmission device which includes a pair of jaw clutches and a friction clutch connecting the device to a drive member, which shifting means is so arranged as to prevent breakage or unintentional disengagement of the jaw clutches by arranging the friction clutch so that it may only be shifted to an engaged position after either of the jaw clutches is in a fully engaged position, and also by so arranging the shifting mechanism that the engaged clutch jaws are not shifted to a disengaged position until the friction clutch is first disengaged.

Another object of my invention is to provide a novel form of manually controllable spring-actuated shifting mechanism for these clutches which first positively shifts one of the jaw clutches and then shifts the friction clutch to an engaged position after the jaw clutch is in a fully engaged position, and which also shifts the friction clutch shifting mechanism to a position to permit said friction clutch to be released before releasing the jaw.

Other objects of my invention will appear from time to time as the accompanying specification proceeds.

My invention may be more clearly understood with reference to the accompanying drawing wherein:

Figure 1 is a plan view of a transmission device constructed in accordance with my invention, with certain parts broken away and shown in section in order to more clearly illustrate the details thereof;

Figure 2 is a partial fragmentary sectional view taken substantially along line 2—2 of Figure 1;

Figure 3 is a partial fragmentary sectional view taken substantially along line 3—3 of Figure 1;

Figure 4 is an enlarged detail view of the shifting mechanism for the jaw clutches showing said mechanism in an engaged position;

Figure 5 is a detail view somewhat similar to Figure 4 and drawn to the same scale as Figure 4 but with the parts in a different position than in Figure 4; and Figure 6 is an enlarged detail view showing certain details of the means for shifting the friction clutch.

In the drawing, the embodiment of my invention illustrated includes a gear train, generally indicated by reference character 10, which drives a shaft 11 journaled in a casing 12 for the transmission device. Said shaft has a pair of bevel pinions 13, 13 freely mounted thereon and disposed adjacent opposite sides of the inside of the casing. Each of said bevel pinions is provided with an inwardly projecting flanged hub 14 having spiral clutch jaws 15, 15 formed integral therewith. Said clutch jaws are adapted to be engaged by corresponding spiral clutch jaws 16, 16 on opposite faces of a clutch collar 17. Said clutch collar is feathered on said shaft so that either of said bevel pinions may be driven therefrom.

The bevel pinions 13, 13 mesh with and drive a bevel gear 19 on a shaft 20 mounted in said casing and extending perpendicular to the shaft 11. The bevel gear 19 is adapted to be selectively connected with a sleeve 21 for driving said sleeve by means of a friction clutch generally indicated by reference character 23.

The friction clutch 23, as herein shown, includes a drum 24 extending over the hub of said bevel gear and herein shown as being formed integral with the sleeve 21. A plurality of interengaging friction disks 25, 25 are disposed within said drum and are interposed between said drum and the bevel gear 19 so that engagement of said disks with each other and said drum and bevel gear will cause said sleeve to be driven by said bevel gear. Said friction disks are moved to an engaged position in a suitable manner well known to those skilled in the art, as for instance, pins 26, 26 engaging an annular ring 27 within said drum at their inner ends. Said pins extend through said drum and their outer ends are secured to an annular flange 28 of a shifting member 29. Compression springs 30, 30 encircle said pins and are interposed between the outer side of said drum and said annular flange to tend to move said engaging member and disks to a disengaged position.

The shifting member 29 is shifted along the sleeve 21 by means of a pair of rods 33, 33 secured to ears 34, 34 projecting from opposite sides of said annular flange. Said rods extend over and beyond the bevel gear 19, shaft 11, and bevel pinions 13, 13, and their ends opposite said shifting member are slidably mounted in bosses 36, 36 projecting outwardly from said casing. Movement of said rods in one direction or another will accordingly engage or disengage the friction clutch 23.

The clutch 23 is adjusted by means of a pair of sprockets 37, 37 and a chain 38 connecting said sprockets together. One of said sprockets is threaded on each of the rods 33 so that rotation of said sprockets will translationally move said rods with respect to said casing. A suitable opening (not shown) is provided in said casing to permit ready access to said adjusting means. The hubs of said sprockets are mounted in bosses 39, 39 formed integral with a shifting bracket 40. Said bracket is provided with a central inwardly extending boss 41 adapted to be engaged by inwardly projecting lever arms 42, 42 of a pair of bell crank levers 43, 43. Said bell crank levers are in turn pivotally mounted between spaced apart brackets 44, 44 extending transversely across the inside of the casing 12 and mounted in opposite halves thereof as is shown in Figure 3. Thus, movement of said bell crank members in one direction will move said shifting bracket toward an outer side of the casing 12, which will engage the friction clutch 23, and movement of said bell crank levers in an opposite direction will permit said friction clutch to be disengaged.

With reference now in particular to the novel means for shifting the clutch collar 17 along the shaft 11 and for engaging either pair of clutch jaws 16, 16 with the clutch jaws 15, 15 of one bevel pinion 13, for selectively driving either of said pinions from said shaft and also engaging the friction clutch 23 after the respective clutch jaws are fully engaged, a clutch yoke 47 is provided. Said clutch yoke engages a peripheral groove 48 formed in said clutch collar and projects from said clutch collar so that its outer end may be slidably mounted on a transverse shaft 49. Said shaft is slidably mounted in the sides of said casing for transverse movement with respect thereto and forms a shifting member for said yoke and clutch collar. A pair of flanges 50, 50 of an irregular formation are herein shown as being formed on said shifting member. Said flanges are so positioned that they are spaced equal distances from opposite sides of the yoke 47 when the clutch collar 17 and shaft 49 are in a neutral position. Compression springs 51, 51 encircle the shaft 49 and are interposed between said flanges and opposite sides of the yoke 47 so that said yoke will be shifted through said compression springs upon rectilinear movement of the shaft 49.

The means for permitting respective of said springs to be compressed whereby they may actuate the clutch shifting mechanism includes latches 54, 54 pivotally mounted to opposite inner walls of the casing 12. Said latches extend inwardly from said walls along the shaft 49 toward the yoke 47 for selective engagement therewith. The latches 54, 54 are each provided with a slotted under surface 55, 55, one end of which is adapted to be engaged with and hold the yoke 47 from movement in one direction, and the other end of which is adapted to stop movement of said yoke in an opposite direction, to prevent its movement beyond a predetermined point. The latches 54, 54 are also each provided with an inclined under surface 59. Said inclined surfaces are adapted to be engaged by cam-like surfaces on the irregular flanges 50, 50 for lifting respective of said latches and disengaging them from the yoke 47.

When the shaft 49 is moved in one direction to engage one set of clutch jaws 16 with the clutch jaws 15 on one bevel pinion 13, the associated latch 54 will engage the yoke 47 and hold it from movement. Further movement of said shaft in the same direction will cause compression of one of the springs 51. At the same time the cam-like surface of the associated annular flange 50 will engage the cam-like surface 59 of the latch 54 which will raise said latch and disengage it from said yoke. At this point, the compression spring 51 will positively move the yoke 47 and clutch collar 17 in a direction to engage the respective clutch jaws 16 with the clutch jaws 15. Thus, said clutch jaws will be positively engaged by means of one spring 51 and will be held in such a position by means of said spring.

Further movement of the shaft 49 will cause the inner face of the flange 50 to engage a free end of a lever arm 60 of the bell crank member 43. This will pivot said bell crank member in an inward direction and cause the other arm 42 thereof, which engages the boss 41, to move said boss and the shifting bracket 40 toward an outer side of said casing and thus move the friction clutch 23 to an engaged position. The shaft 49 may be shifted by any suitable system of levers (not shown) in a manner well known to those skilled in the art and may be locked in an engaged position by means of suitable locking mechanism of any well known construction (not shown).

When the shaft 49 is shifted in a direction to disengage one set of clutch jaws 16 from the respective clutch jaws 15, the initial movement of said shaft will move the annular flange 50 holding the friction clutch 23 in an engaged position, in a direction to permit disengagement of said friction clutch. Movement of said shaft a further distance will disengage the aforementioned set of clutch jaws 16 from the associated clutch jaws 15 through the spring 51 opposite from the spring which serves to engage said clutch jaws. Thus the friction clutch 23 is in a position to be fully disengaged before disengagement of one set of clutch jaws 16 from the associated clutch jaws 15.

It may thus be seen that a positive shifting means of a novel construction has been provided for connecting either one of the pinions 13, 13 to the shaft 11 so that either of said pinions may be driven therefrom, and that this shifting means also serves to shift the friction clutch 23 to an engaged position to connect the bevel gear 19 to drive the sleeve 21 after the respective clutch jaws 15 and 16 are in a fully engaged position, so that said friction clutch cannot be shifted until said aforementioned clutch jaws are fully engaged. Thus, a novel arrangement of clutches has been provided which prevents a load from being placed on the jaw clutches until they are fully engaged and which releases the load from said jaw clutches before they are moved to a disengaged position. This permits the shifting of said clutches when loaded and thus simplifies the shifting thereof and prevents injury thereto.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims:

I claim as my invention:

1. In a transmission device, a driving shaft, a pair of spaced apart gears coaxial therewith, a pair of clutches for driving said gears from said shaft including a common clutch member on said shaft, between said gears, a third gear meshed with said first mentioned gears, a drive member coaxial with said third gear, and a third clutch for selectively connecting said third gear with said drive member, means for shifting said common clutch member for selectively connecting either one of said first-mentioned gears to said shaft including a shifting member movable parallel to said shaft, a yoke engaging said shifting member and having a portion extending toward said shifting member, and compression means interposed between opposite sides of said yoke and said shifting member whereby said clutch member is moved along said shaft through said compression means upon movement of said shifting member, and means engaging said shifting member and actuated upon movement thereof beyond a position where either of said first-mentioned clutches is engaged, for engaging said third-mentioned clutch.

2. In a transmission device, a driving shaft, a pair of spaced apart gears coaxial therewith, a pair of clutches for driving said gears from said shaft including a common clutch member on said shaft, between said gears, a third gear meshed with said first mentioned gears, a drive member coaxial with said third gear, and a third clutch for selectively connecting said third gear with said drive member, means for shifting said common clutch member for selectively connecting either one of said first-mentioned gears to said shaft including a shifting member movable parallel to said shaft, a yoke engaging said clutch member and having a portion extending towards said shifting member, means for yieldably moving said yoke upon movement of said shifting member including a pair of compression springs, each of said springs being interposed between opposite sides of said yoke and fixed abutments on said shifting member, means for holding said yoke from movement until one of said springs may reach a predetermined stage of compression, means for releasing said holding means to permit said compressed spring to positively move said yoke and clutch member to an engaged position, and means actuated upon further movement of said shifting member against said released spring for engaging said third clutch after either of said other clutches is fully engaged.

3. In a transmission device, a driving shaft, a pair of spaced apart gears coaxial therewith, a pair of clutches for driving said gears from said shaft including a common clutch member on said shaft, between said gears, a third gear meshed with said first-mentioned gears, a drive member coaxial with said third gear, and a third clutch for selectively connecting said third gear with said drive member, means for shifting said common clutch member for selectively connecting either one of said first-mentioned gears to said shaft including a shifting member movable parallel to said shaft, means for yieldably moving said clutch member upon movement of said shifting member including a pair of compression springs interposed between said shifting member and clutch member, a pair of latches, one of said latches being adapted to hold one of said springs so it will be compressed upon movement of said shifting member, means actuated by movement of said shifting member for releasing the holding latch and releasing said associated compressed spring so said spring may move said clutch member to an engaged position, and means actuated upon further movement of said shifting member against said released spring for engaging said third clutch after either of said other clutches is fully engaged.

4. In a transmission device, a driving shaft, a pair of spaced apart gears coaxial therewith, a pair of clutches for driving said gears from said shaft including a common clutch member on said shaft, between said gears, a third gear meshed with said first-mentioned gears, a drive member coaxial with said third gear, and a third clutch for selectively connecting said third gear with said drive member, means for shifting said common clutch member for selectively connecting either one of said first-mentioned gears to said shaft including a shifting member movable parallel to said shaft, means for yieldably moving said clutch member upon movement of said shifting member including a pair of compression springs interposed between said shifting member and clutch member, a pair of latches, one of said latches being adapted to hold one of said springs so it will be compressed upon movement of said shifting member, means actuated by movement of said shifting member for releasing the holding latch and releasing said associated compressed spring so said spring may move said clutch member to an engaged position, and means adapted to be engaged by said shifting member and operative only when either of said first-mentioned clutches is fully engaged for connecting said third-mentioned gear with said drive member through the engagement of the third mentioned clutch.

5. In a transmission device, a driving shaft, a pair of spaced apart gears coaxial therewith, a pair of clutches for selectively driving said gears from said shaft including a common clutch collar on said shaft, between said gears, a third gear meshed with said first mentioned gears, a drive member coaxial with said third gear, and a third clutch for selectively connecting said third gear with said drive member, means for shifting said clutch collar for selectively connecting either one of said first-mentioned gears to said shaft including a shifting member movable parallel to said shaft, a yoke engaging said clutch collar and having a portion extending over said shifting member and movable freely with respect thereto, means for yieldably moving said yoke and clutch collar upon movement of said shifting member including a pair of compression springs, each of said springs being interposed between opposite sides of said yoke and fixed abutments on said shifting member, a pair of latches adapted to engage opposite sides of said yoke whereby one of said latches may hold said yoke from movement until the associated spring reaches a predetermined stage of compression, means actuated by movement of said shifting member for releasing said respective latch to permit said compressed spring to move said yoke to engage the respective one of said pair of clutches, and means actuated by said means for releasing said latch upon movement of said shifting member against said compressed spring after said respective clutch is in an engaged position for shifting said third-mentioned clutch and driving said drive member from said third-mentioned gear.

6. In a reversible transmission device, a driving shaft, a pair of spaced apart gears coaxial therewith, a pair of spiral jaw clutches forming a means for selectively connecting either of said gears with said shaft and including a common clutch collar having spiral jaws on opposite sides thereof, a third gear meshed with said first mentioned gears, a drive member coaxial with said third gear, and a friction clutch for selectively connecting said third gear to said drive member, manually controllable yieldable shifting means for shifting said clutch collar and selectively connecting either one of said first-mentioned gears to said shaft including a rectilinearly movable shifting member, a yoke having connection with said clutch collar, and a yieldable connection between said yoke and shifting member whereby movement of said shifting member in either direction beyond a certain predetermined point will cause positive movement of said yoke actuated by said yieldable means, and a connection between said shifting member and said friction clutch for engaging said friction clutch upon movement of said shifting member after either of said first-mentioned clutches is in an engaged position.

7. In a reversible transmission device, a driving shaft, a pair of spaced apart gears coaxial therewith, a pair of spiral jaw clutches forming a means for selectively connecting either of said gears with said shaft and including a common clutch collar having spiral jaws on opposite sides thereof, a third gear meshed with said first mentioned gears, a drive member coaxial with said third gear, and a friction clutch for selectively connecting said third gear to said drive member, manually controllable yieldable shifting means for shifting said clutch collar and selectively connecting either one of said first-mentioned gears to said shaft including a rectilinearly movable shifting member, a yoke having connection with said clutch collar, yieldable means interposed between opposite sides of said yoke and said shifting member, means for holding said yoke from movement until one of said yieldable means is in a compressed position and thence releasing said yoke to permit said compressed yieldable member to move said yoke and shift said clutch collar, and means actuated by movement of said shifting member after either of said first-mentioned clutches is in an engaged position, for engaging said friction clutch with said third-mentioned gear.

8. In a reversible transmission device, a driving shaft, a pair of spaced apart gears coaxial therewith, a pair of spiral jaw clutches forming a means for selectively connecting either of said gears with said shaft and including a common clutch collar having spiral jaws on opposite sides thereof, a third gear meshed with said first mentioned gears, a drive member coaxial with said third gear, and a friction clutch for selectively connecting said third gear to said drive member, manually controllable yieldable shifting means for shifting said clutch collar and selectively connecting either one of said first-mentioned gears to said shaft including a rectilinearly movable shifting member, a yoke having connection with said clutch collar, compression springs interposed between opposite sides of said yoke and fixed abutments on said shifting member, a pair of latches, one of said latches being adapted to engage said yoke and hold it from movement upon movement of said shifting member in one direction, and the other of said latches being adapted to engage said yoke and hold it from movement upon movement of said shifting member in an opposite direction, and means for releasing said respective latch upon movement of said shifting member beyond a predetermined position, said means also acting as a means for engaging said friction clutch after either of said first-mentioned clutches is in an engaged position.

9. In a transmission device, and in combination with a driving shaft, a pair of spaced apart bevel gears coaxial therewith, a spiral jaw clutch associated with each of said gears including a clutch collar on said shaft having spiral jaws on opposite ends thereof for selectively meshing with spiral jaws on said gears, a third bevel gear meshing with said first-mentioned bevel gears, a driven member coaxial therewith and friction clutch means for operatively connecting said gear with said driven member, a shifting member, manually controllable spring actuated mechanism actuated by movement of said shifting member for shifting said clutch collar and selectively engaging either of said first-mentioned clutches, and means operable upon movement of said shifting member after either of said clutches is in an engaged position for moving said friction clutch to an engaged position.

10. In a transmission device, and in combination with a driving shaft, a pair of spaced apart bevel gears coaxial therewith, a spiral jaw clutch associated with each of said gears including a clutch collar on said shaft having spiral jaws on opposite ends thereof for selectively meshing with spiral jaws on said gears, a third bevel gear meshing with said first-mentioned bevel gears, a driven member coaxial therewith, and friction clutch means for operatively connecting said gear with said driven member, a yoke engaging said clutch collar, a rectilinearly movable shaft disposed parallel to said first-mentioned shaft, a pair of compression springs encircling said shaft and interposed between opposite sides of said yoke and fixed abutments on said shaft, a latch engaging said yoke for holding said yoke from movement against one of said springs, means engaging said latch upon rectilinear movement of said shaft for releasing said latch from said yoke and permitting one of said springs to move said yoke and shift said clutch collar against said other spring, and an operative connection between said means for releasing said latch and said friction clutch for engaging said friction clutch upon rectilinear movement of said shaft beyond the point where either of said first-mentioned clutches is in an engaged position.

11. In a transmission device, and in combination with a driving shaft, a pair of spaced apart bevel gears coaxial therewith, a spiral jaw clutch associated with each of said gears, a clutch collar on said shaft having spiral jaws on opposite ends thereof for selectively meshing with said spiral jaw clutches on said gears, a third bevel gear meshing with said first-mentioned bevel gears, a driven member coaxial therewith, and friction clutch means for connecting said gear with said driven member, a yoke engaging said clutch collar, a rectilinearly movable shaft disposed parallel to said first-mentioned shaft, a pair of compression springs encircling said shaft and interposed between opposite sides of said yoke and fixed abutments on said shaft, a latch engaging said yoke for holding said yoke from movement against one of said springs and means engaging said latch upon rectilinear movement of said shaft for releasing said latch from said yoke and permitting said associated spring to move said yoke and shift said clutch collar against said other spring, an operative connection between said means for releasing said latch and said friction clutch, for engaging said friction clutch upon rectilinear movement of said shaft beyond the point where either of said first-mentioned clutches is in an engaged position including a rocking member engaged by said unlatching member, and a connection between said rocking member and said friction clutch whereby movement thereof will move said friction clutch to an engaged position.

12. In a power transmission device, a driving shaft, a pair of spaced apart gears coaxial therewith, a pair of clutches for selectively driving said gears from said shaft including a common clutch member on said shaft, between said gears, a third gear meshed with said first mentioned gears, a drive member coaxial with said third gear, and a third clutch for selectively connecting said third gear with said drive member, means for shifting said clutch member for selectively connecting either one of said first-mentioned gears to said shaft including a rectilinearly movable shifting member and a clutch yoke mounted thereon for yieldable movement therealong, and a rocking member adapted to be engaged by said shifting means, after either of said first-mentioned clutches is fully engaged, for connecting said third-mentioned gear with its respective drive member.

13. In a power transmission device, a driving shaft, a pair of spaced apart gears coaxial therewith, a pair of clutches for selectively driving said gears from said shaft including a common clutch member on said shaft, between said gears, a third gear meshed with said first mentioned gears, a drive member coaxial with said third gear, and a third clutch for selectively connecting said third gear with said drive member, a manually controllable spring actuated mechanism for shifting said clutch member for selectively connecting either one of said first-mentioned gears to said shaft including a shifting member, a yoke mounted on said shifting member and a pair of opposed springs connected between said shifting member and yoke, and a rocking member adapted to be engaged by said shifting member, after either one of said first-mentioned clutches has been engaged, for moving said third-mentioned clutch to an engaged position.

FRANK CARTLIDGE.